(12) United States Patent
Crider

(10) Patent No.: US 6,669,049 B2
(45) Date of Patent: Dec. 30, 2003

(54) BLOW-MOLDED CONTAINER AND CLOSURE, AND METHOD AND APPARATUS FOR MAKING SAME

(75) Inventor: Matthew A. Crider, York, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 10/278,928

(22) Filed: Oct. 23, 2002

(65) Prior Publication Data

US 2003/0042219 A1 Mar. 6, 2003

Related U.S. Application Data

(62) Division of application No. 09/618,170, filed on Jul. 18, 2000, now Pat. No. 6,495,089.

(51) Int. Cl.[7] .............................................. B65D 43/14
(52) U.S. Cl. ....................... 220/833; 220/521; 220/659; 220/600; 220/200
(58) Field of Search ................................ 220/833, 834, 220/836, 840, 657, 658, 689, 521, 600, 200

(56) References Cited

U.S. PATENT DOCUMENTS

| | | | |
|---|---|---|---|
| 3,086,249 A | 4/1963 | Nelson et al. | |
| 3,359,602 A | 12/1967 | Bailey | |
| 3,369,690 A | 2/1968 | Hayes | |
| 3,409,710 A | 11/1968 | Klygis | |
| 3,679,785 A | 7/1972 | Dike | 264/98 |
| 3,983,199 A | 9/1976 | Uhlig | 264/89 |
| 4,082,827 A | 4/1978 | Chlystun | 264/98 |
| 4,382,058 A | 5/1983 | Watson et al. | 264/527 |
| 4,453,911 A | 6/1984 | Watson et al. | 425/525 |
| 4,466,541 A * | 8/1984 | Tabler et al. | 206/506 |
| 4,486,164 A | 12/1984 | Wilkie et al. | 425/525 |
| 4,486,379 A | 12/1984 | Wilkie et al. | 264/526 |
| 4,733,801 A | 3/1988 | Scammell | 222/107 |
| 5,008,066 A | 4/1991 | Mueller | 264/537 |
| 5,038,454 A | 8/1991 | Thornock et al. | 29/451 |
| 5,044,923 A | 9/1991 | Przytulla | 425/525 |
| 5,078,297 A * | 1/1992 | Howard et al. | 220/533 |
| 5,106,569 A | 4/1992 | Rathman et al. | 264/529 |
| 5,165,558 A | 11/1992 | Cargile | 215/100 R |
| 5,213,753 A | 5/1993 | Przytulla | 264/534 |
| 5,242,074 A * | 9/1993 | Conaway et al. | 220/840 |
| 5,275,780 A | 1/1994 | Robinson | 264/529 |
| 5,553,732 A | 9/1996 | Kani | 220/212 |
| 5,601,214 A | 2/1997 | Hendrickson et al. | 222/517 |
| 5,638,838 A * | 6/1997 | Lombardi | 132/294 |
| 5,662,245 A | 9/1997 | Grant | 222/153.07 |
| 5,762,859 A | 6/1998 | Kani | 264/523 |
| 5,769,260 A * | 6/1998 | Killinger et al. | 220/533 |
| 5,865,338 A | 2/1999 | Conn | 220/675 |
| 5,885,517 A | 3/1999 | Hendrickson et al. | 264/539 |
| 6,290,094 B1 | 9/2001 | Arnold et al. | 220/839 |

FOREIGN PATENT DOCUMENTS

WO   WO 97/32791   9/1997

OTHER PUBLICATIONS

Handbook of Package Engineering by Joseph Hanlon, Published by McGraw Hill 1971 pp. 8–45 to 8–73.*

* cited by examiner

Primary Examiner—Joseph Man-Fu Moy
(74) Attorney, Agent, or Firm—Howson and Howson

(57) ABSTRACT

A blow-molded plastic container and reinforced lid are simultaneously produced in a blow mold. A lid is reinforced by having a portion of the lid formed by blow molding techniques and another portion of the lid formed by compression molding techniques. The container and lid combination, a method for making the combination and apparatus for making the combination are provided.

13 Claims, 4 Drawing Sheets

BLOW-MOLDED CONTAINER AND CLOSURE, AND METHOD AND APPARATUS FOR MAKING SAME

CROSS REFERENCE TO RELATED APPLICATION

The present application is a division of co-pending application Ser. No. 09/618,170 filed on Jul. 18, 2000 now U.S. Pat. No. 6,495,089.

FIELD OF THE INVENTION

The present invention relates to a blow-molded plastic container and a corresponding closure produced by a combination of blow molding/compression molding techniques, and more particularly, the present invention relates to a method and apparatus for the simultaneous manufacture of a blow molded container and a partially blow-molded, partially compression molded closure within the same blow mold.

BACKGROUND OF THE INVENTION

Various consumer products, such as food products, are packaged for sale in blow-molded plastic containers sealed with a closure. Typically, the containers are mass produced in high speed blow-molding machines, and the closures, such as caps and lids, are manufactured separately from the containers in injection molds. The separate manufacture of the containers and closures has a significantly impact on the overall cost of mass producing such a package. Such increased costs include manufacturing, tooling and material costs.

Another disadvantage of manufacturing containers and closures utilizing different molding processes is that such processes require the use of different plastic materials which results in the containers being made of one type of plastic material and the closures being made of another. Such a package complicates and increases the cost of recycling the containers and closures and does not readily permit precise color matching between the container and closure. Thus, the separate manufacture of the container and closure also has a negative impact on the aesthetic appearance of the package and its ability to be readily recycled.

To overcome these problems, the assignee of the present application has previously developed and disclosed in International Application No. PCT/US97/03153, published as International Publication Number WO 97/32791 on Sep. 12, 1997, a method for compression molding a closure in the flash material of an extrusion blow mold. To this end, a parison is extruded within a blow mold having a container body cavity and a lid cavity. The parison is blown in the container body cavity to form the container body and is compressed in the lid cavity to form a compression molded lid for the blow molded container. Thus, the lid is formed in the flash material which would otherwise be removed from the container and recycled as scrap material. The entire package can be readily recycled and can be a consistent color throughout.

Other examples of forming articles in the flash material compressed in blow molds include U.S. Pat. No. 4,082,827 issued to Chlystun; U.S. Pat. No. 5,165,558 issued to Cargile; U.S. Pat. No. 3,359,602 issued to Bailey; U.S. Pat. No. 3,369,690 issued to Hayes; U.S. Pat. No. 3,679,785 issued to Dike; U.S. Pat. No. 5,275,780 to Robinson; and U.S. Pat. No. 3,983,199 issued to Uhlig. The Chlystun patent discloses compression molding an integral pull tab; the Cargile patent discloses compression molding a breakaway measuring cup; and the Bailey, Hayes, Dike, Robinson and Uhlig patents disclose compression molding an integral handle.

Other U.S. patents disclose the formation of blown closures within the container body cavity of a blow mold. To this end, the container body and closure are blown as a single intermediate body within a blow mold cavity. The blown intermediate article is then severed and trimmed to form a separate container body and closure. See for instance, U.S. Pat. Nos. 5,553,732 and 5,762,859 issued to Kani; U.S. Pat. Nos. 5,044,923 and 5,213,753 issued to Przytulla; U.S. Pat. No. 3,409,710 issued to Klygisis; and U.S. Pat. No. 5,865,338 issued to Conn. Also see U.S. Pat. No. 5,106,569 issued to Rathman et al.; U.S. Pat. Nos. 4,382,058 and 4,453,911 issued to Watson et al.; and U.S. Pat. Nos. 4,486,164 and 4,486,379 issued to Wilkie et al. for examples of blow molded tool box-shaped containers, or cases, having opposed blow-molded tub-shaped portions integrally connected by a compression molded hinge.

In addition to the need for a cost-effective, readily recyclable and aesthetic container and closure combination and a method and apparatus for making same, there is also a specific need for a substantially tub-shaped container having an upper rim and a novel closure, or lid, for sealing the container. Such a container may be used as a multi-purpose package, for instance, in club or warehouse stores for the sale of powders such as drink powders, candy or any other product capable of being sold in tub-shaped containers. The upper rim of such a container provides a wide opening into the container and is sealed with a relatively large flat lid which spans the opening and engages the rim. Typically, the central most portion of such a lid will warp and otherwise provide an unaesthetic appearance.

Although the above referenced container and closure combinations and methods and apparatus for the manufacture thereof may function satisfactorily for their intended purposes, there is a need for a novel method and apparatus for the cost-effective manufacture of a container and closure combination. In addition, there is also a specific need for a novel container and closure combination which includes a tub-shaped blow molded container and a reinforced lid. The lid should have improved rigidity and definition to prevent warpage and should provide an aesthetically pleasing package. The container and lid should be capable of efficient and simultaneous manufacture in the same blow mold, should be readily recyclable, and should have substantially flawless color matching.

OBJECTS OF THE INVENTION

With the foregoing in mind, a primary object of the present invention is to provide a novel method for simultaneously forming a plastic container and associated closure from a single extruded parison in the same blow mold utilizing a combination of blow molding and compression molding techniques.

Another object of the present invention is to a provide a closure, or lid, with increased rigidity and definition so that the lid can be utilized in connection with a wide-mouth tub-shaped container without undergoing warpage and can provide an aesthetically pleasing appearance.

A further object of the present invention is to provide a novel method and apparatus for manufacturing a reinforced closure, or lid, in a blow mold.

A still further object of the present invention is to provide apparatus which enables the formation of various indentations and undercuts to be formed in a blown container and/or closure and which enables ready ejection of the container and a reinforced closure from the mold.

SUMMARY OF THE INVENTION

More specifically, the present invention provides a method of manufacturing a plastic container and associated closure in which a parison is extruded within an open set of mold blocks. The mold blocks, when closed, cooperate to form a container forming cavity and a separate closure forming cavity through which the parison extends. The parison located in the container forming cavity is blown to form a container body while a portion of the parison located in the closure forming cavity is separately blown to form at least a part of a closure. A remaining portion of the parison located in the closure forming cavity is compression molded to form a remaining part of the closure which extends integrally from the blow molded part of the closure. Preferably, blow molding of the container body, blow molding of the part of the closure, and compression molding of the remaining part of the closure occur substantially simultaneously. The present invention also provides a container and closure combination made by the above described process.

According to another aspect of the present invention, a novel apparatus for manufacturing a container and associated closure is provided. The apparatus includes a set of mold blocks moveable from an open position to a closed position to capture an extruded parison therein and moveable from the closed position to the open position for releasing a container body and closure therefrom. The mold blocks, when closed, cooperate to provide a blow molded container forming cavity and a separate closure forming cavity which includes a blow-molding section and a compression molding section. A first blow pin is extendable into the container forming cavity for forming a blow-molded container body therein, and a second blow pin is extendable into the blow molding section of the closure forming cavity to blow a portion of the closure. The compression molding section forms a remaining integral compression molded portion of the closure. Preferably, the mold blocks and first and second blow pins are operable to substantially simultaneously form the blow molded container body and partially blow molded, partially compression molded closure.

According to yet another aspect of the present invention, a novel container and reinforced lid combination is provided. The container has an extrusion blow molded body with an upper rim. The lid has a hollow central blow molded portion and a peripheral compression molded portion extending outwardly and integrally from the hollow central blow molded portion. The peripheral compression molded portion of the lid is engageable with the upper rim of the container body to secure the lid to the container, and the hollow central blow molded portion of the lid reinforces the lid structure to increase rigidity and definition and prevent warpage.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED CONTAINER/CLOSURE

Figure 1:
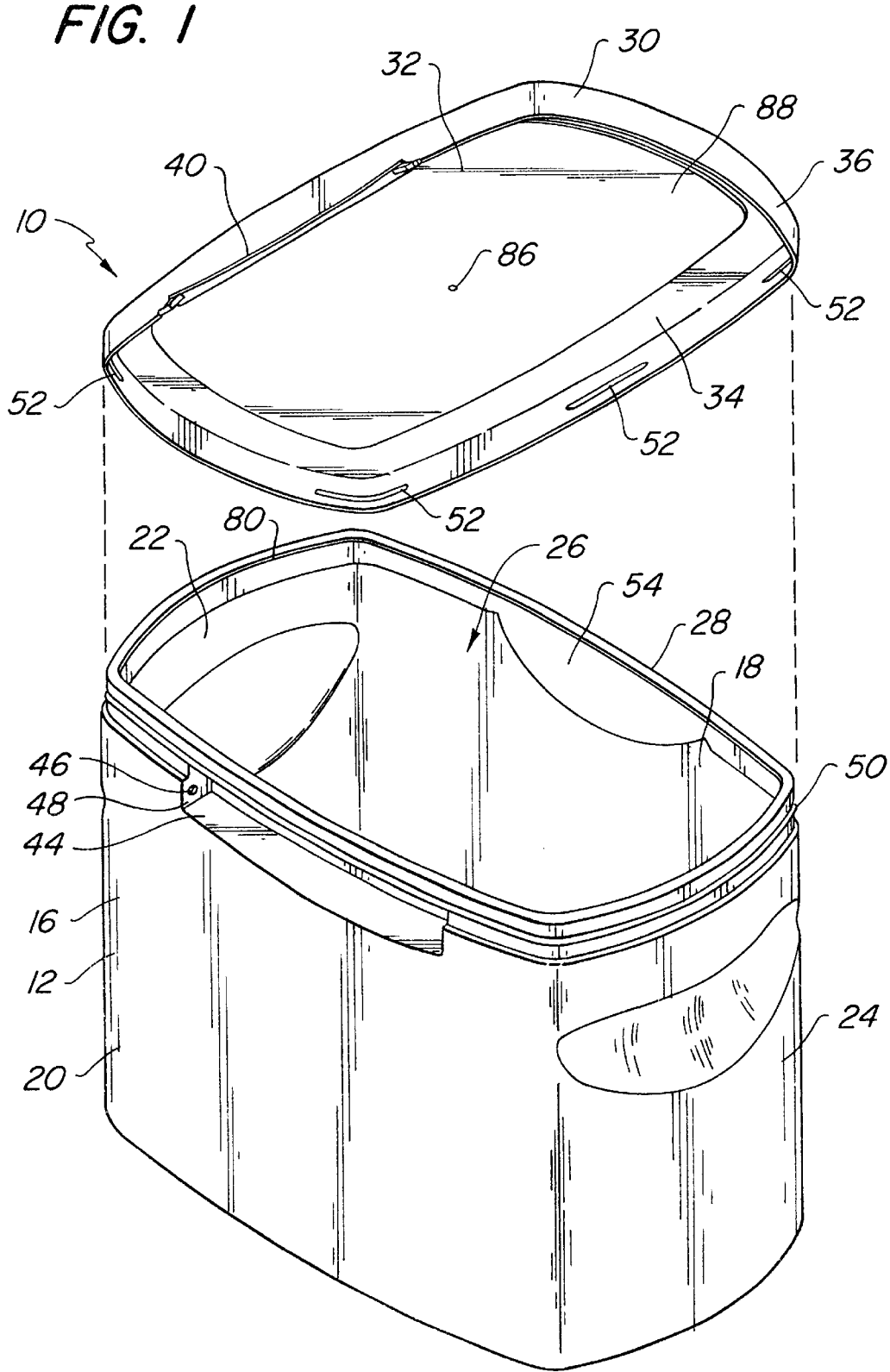
FIG. 1 is a perspective view of a container and lid embodying the present invention.
Figure 4:
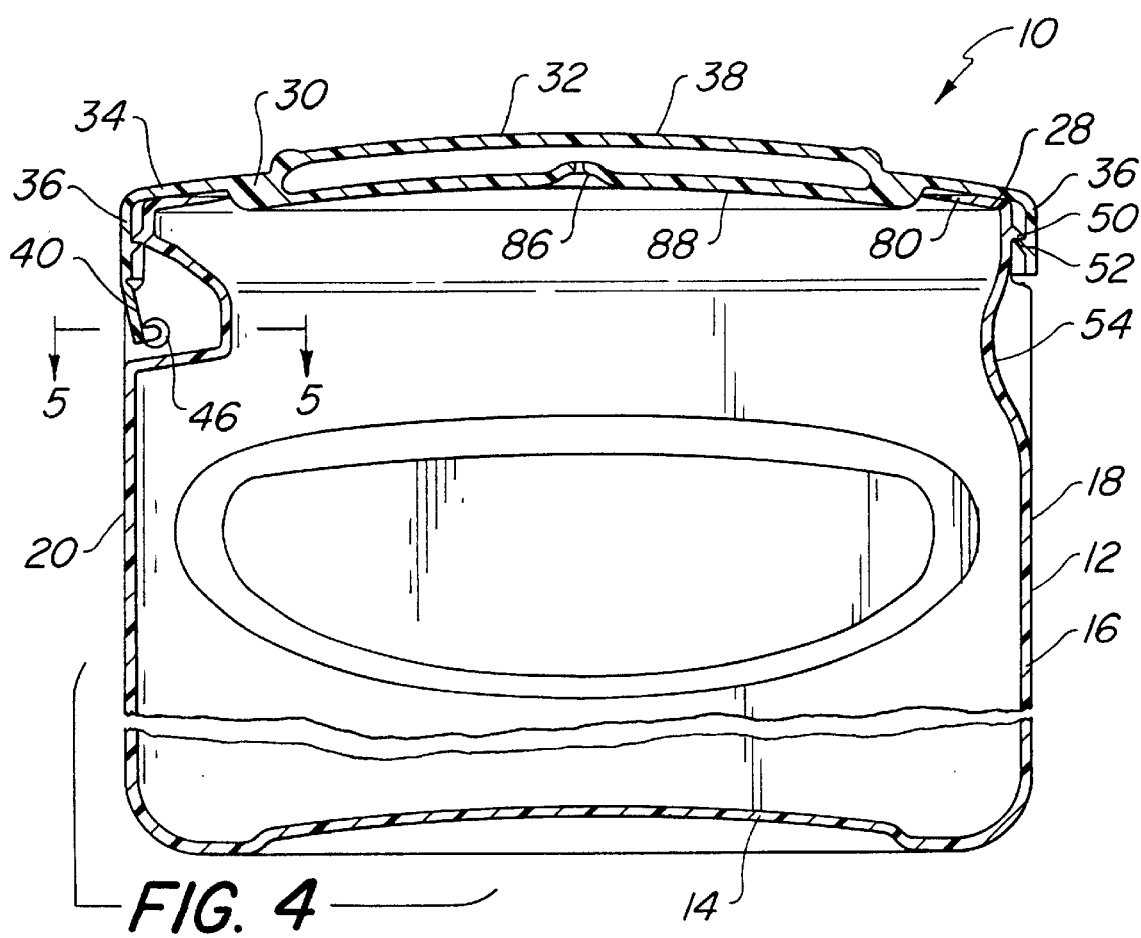
FIG. 4 is a partial cross-sectional view of the container and lid of FIG. 1 illustrating the pivoting connection between the container and lid.

One aspect of the present invention is a preferred container and closure combination 10 as best illustrated in FIGS. 1 and 4. The combination is preferably made by the method and apparatus of the present invention as will be discussed. Before turning to a detailed description of the method and apparatus of the present invention, a discussion of the structure of the preferred container/closure 10 is provided.

The combination 10 includes a plastic extrusion blow-molded container body 12 provided in a substantially tub-shaped configuration. As illustrated, the body 12 is substantially rectangular having a base 14 and an integral upstanding sidewall 16 including front, rear, right and left sidewall sections, 18, 20, 22 and 24, respectively. The container body 12 has a large top opening 26 which is defined by a rim 28 formed by the upper terminating edge of the sidewall 16. Such a tub-shaped container can be utilized to package various products including scoop-able food products provided in powder form, such as, chocolate drink mixes. A sheet-like tamper-indication covering (not shown), such as wax paper, foil, or the like, can be sealed to the rim 28 after initial filling of the container body 12 to initially seal the opening 26, maintain the contents in a sterile environment, and provide indication of tampering. Although a specific container body configuration has been described and illustrated, various other container body structures can be utilized in accordance with the present invention.

A lid 30 having a novel reinforced structure, as best illustrated in FIG. 4, is utilized as a closure or cap for the container body 12. The lid 30 is reinforced to resist warpage which would otherwise occur in a typical flat lid applied to and spanning across the relatively large sized opening 26 of the container body 12. The novel structure of lid 30 includes a hollow central section 32 and a substantially solid peripheral section 34 extending integrally and radially outward from the hollow central section 32. The hollow central section 32 is formed by blow molding a portion of an extruded parison in a blow mold, preferably the same blow mold utilized to form the blown container body 12. The solid peripheral section 34 is formed by compression molding a portion of the extruded parison in the blow mold. Thus, as will be discussed in detail, the same extruded parison can be utilized in the same blow mold to form the container body 12 and lid 30.

The compression molded peripheral section 34 of lid 30 provides a peripheral lip 36 utilized to engage the rim 28 of the container body 12. The blow-molded hollow central section 32 of the lid 30 reinforces the lid 30, prevents the lid 30 from warping, and provides an aesthetically pleasing appearance. In addition, a brand name, logo, or the like (not shown) can be blown into the upward facing side 38 of the lid to increase its aesthetic appeal. The lid 30 is made from the same material as the container body 12, and therefore, is readily recyclable with the container body 12 and is substantially the exact same color as the container body 12.

Figure 5:
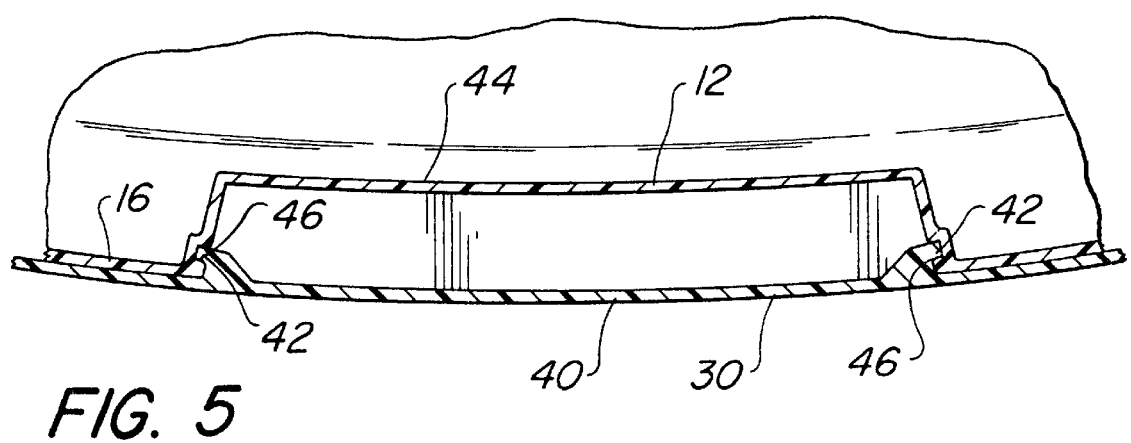
FIG. 5 is a cross-sectional view of the connection illustrated in FIG. 4 taken along line 5—5.

The preferred embodiment, as illustrated, permits the lid 30 to pivot relative to the container body 12 between open and closed positions. To this end, a compression molded hinge connection flap 40 is formed in the compression molded peripheral section 34 of the lid 30. The hinge connection flap 40 extends from the lip 36 and has a pair of oppositely extending lateral projections 42 as best illustrated in FIG. 5. The rear sidewall section 20 of the container body 12 is formed with an inwardly extending recess 44 for receiving the hinge connection flap 40. A pair of depressions 46 are formed in the sidewall sections 48 of the recess 44 and extend substantially parallel to the rear sidewall section 20 of the container body 12. To install the lid 30 on the container body 12, the projections 42 of the hinge connection flap 40 are inserted into the depressions 46 formed in the recess 44 of the container sidewall 16. The projections 42 are captured within the depressions 46 and permit the lid 30 to pivot thereabout.

The lid 30 of the preferred embodiment is adapted to be snap fit to the rim 28 of the container body 12. To this end, preferably the rim 28 has an outwardly extending peripheral bead 50 which frictionally engages a set of locking beads 52 extending inwardly from the lip 36 of the lid 30 to maintain the lid 30 in a closed condition sealing the top opening 26 of the container body 12. See FIG. 4. To enable ready opening of the lid 30, the front sidewall section 18 of the container body 12 is provided with a recess 54 adjacent the rim 28 to permit a person's finger to engage beneath the lip 36 of the lid 30 and to lift upwardly on the lid 30 removing the lid 30 from the rim 28 of the container body 12.

By way of example, and not by way of limitation, the container body 12 can be about 6.5 inches in height from the base 14 to the rim 28, about 8.5 inches in length from the right to the left sidewall section, 22 and 24, and about five inches in width from the front to the rear sidewall section, 18 and 20. The opening 26 can be about 5 by 8.5 inches, and the container body 12 can contain approximately 100 ounces of a product. The lid 30 can be about 5 by 8.5 inches, and the dimensions of the hollow central section 32 can be about 3.5 by 6.5 inches with a maximum thickness of about a half inch. The combination 10 can be made of any thermoplastic material, for example, HDPE or Polypropylene. The above referenced material and dimensions are provided as examples only, and any desired materials and dimensions can be utilized in accordance with the present invention.

Detailed Description of the Preferred Method

As previously stated, the above referenced container and closure combination 10 is formed primarily by extrusion blow molding techniques and partly by compression molding techniques. As well known in the art of extrusion blow molding, a pair of mold halves are initially positioned in an open position to receive an extruded tube of molten plastic, or parison, and are then closed about the parison so that the parison can be blown within the cavity formed by the blow mold. Typically, the sections of the parison above and below the blown body form so called flash material which is trimmed from the blown body and recycled as scrap material.

According to the present invention, a portion 56 of what would be the flash material is utilized to form a closure 30 for the container body 12. Thus, the container body 12 and closure 30 are simultaneously formed in the same mold 58 from the same parison. This provides a package which is made of a common material that can be readily recycled and that is a uniform color.

One novel aspect of the present invention is that the closure 30 is formed by a combination of blow molding and compression molding techniques. To this end, a portion of the parison is blown to form a hollow part 32 of the closure 30 and another portion of the parison is compressed to form a substantially solid part 34 of the closure 30. Thus, the closure 30 includes a hollow section 32 to rigidify the closure and prevent warpage, and a solid section 34 to provide a means of cooperatively engaging the rim 28 of the container body 12.

Figure 2:
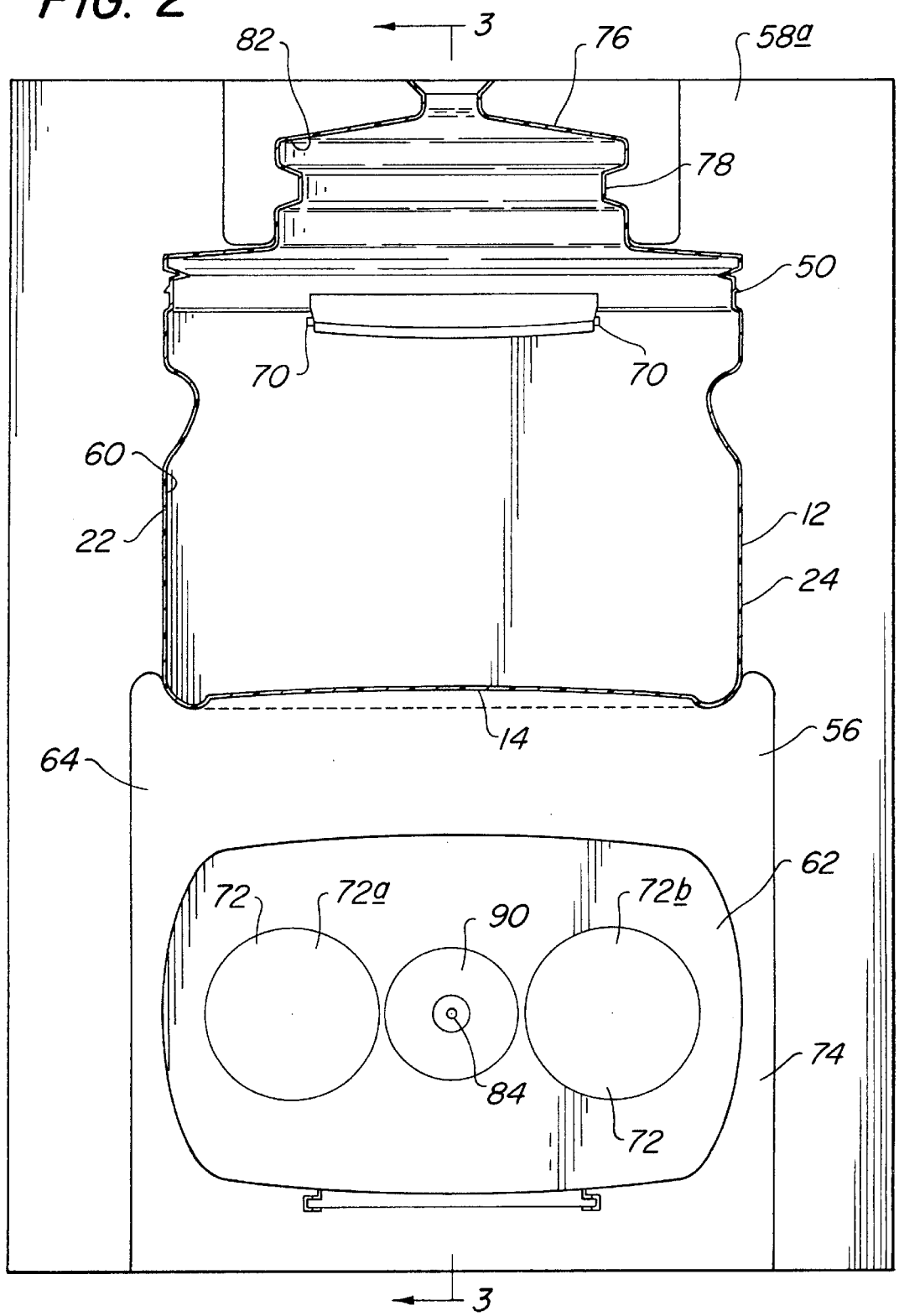
FIG. 2 is a cross sectional view of a blow mold and container formed therein according to the present invention.
Figure 3:
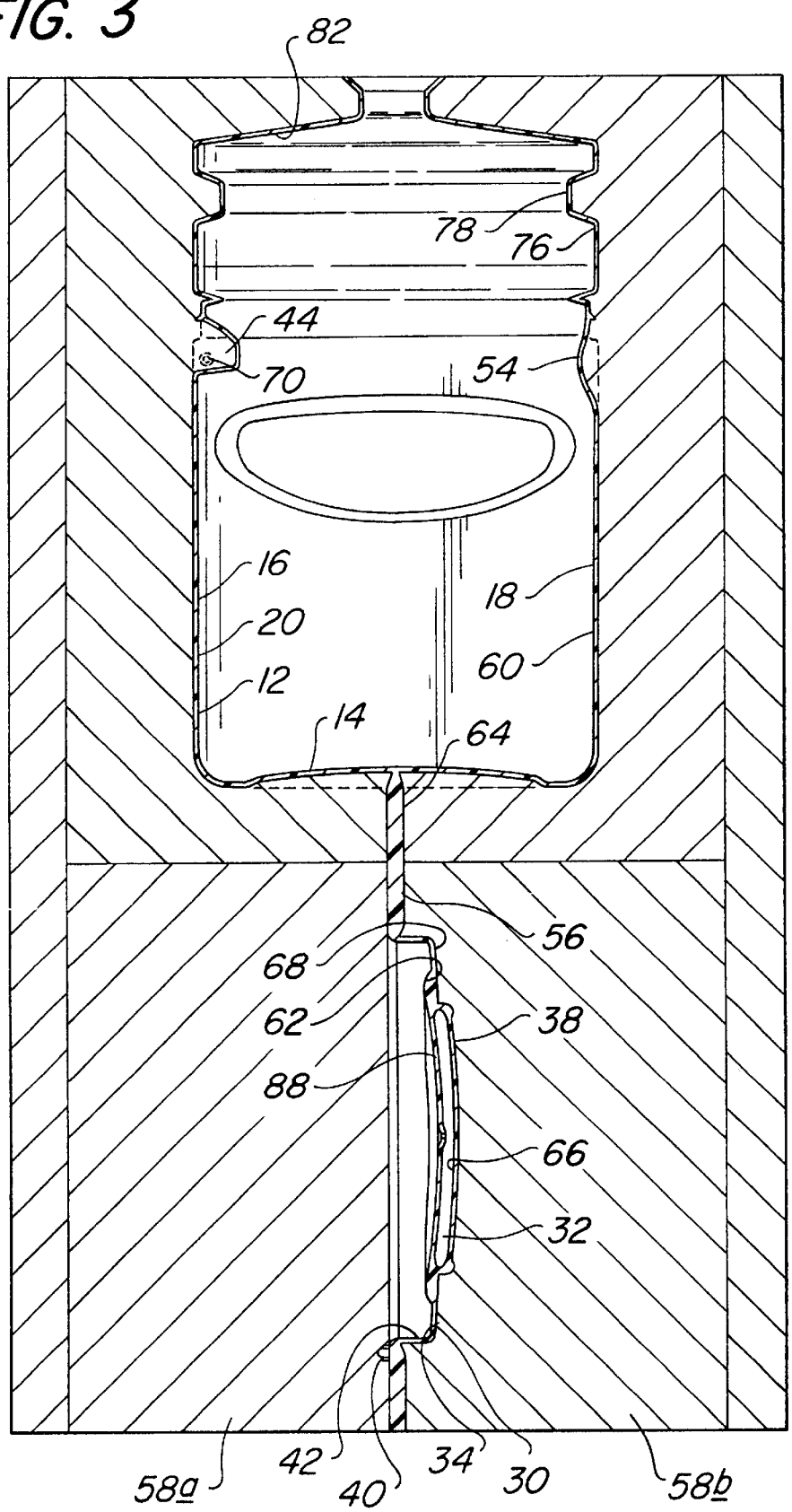
FIG. 3 is a cross-sectional view of the blow mold, container and lid of FIG. 2 taken along line 3—3.

The method according to the present invention utilizes a pair of mold halves 58*a* and 58*b* which cooperate to provide a container body forming cavity 60 and a closure forming cavity 62 best illustrated in FIGS. 2 and 3. These cavities, 60 and 62, are spaced apart in the mold 58 and receive different sections of the same parison. For example, the parison is positioned in the mold 58 such that a proximal end of the parison is used to form the container body 12 and a distal end of the parison is used to form the closure 30. Thus, as the blown and compressed parison is removed from the mold 58, the closure 30 is formed in a tail flash area 64 which extends from the base 14 of the blown container body 12. See FIG. 3.

The closure forming cavity 62 includes a central blow molding cavity 66 and a peripheral compression molding cavity 68. Thus, a portion of the parison is blown as a surrounding portion of the parison is compressed. Therefore, the method of the present invention includes the primary steps of: (i) capturing an extruded parison within a pair of mold blocks, 58*a* and 58*b*; (ii) blow molding a portion of the parison in a container forming cavity 60 to form a blow molded container body 12; (iii) separately blow molding another portion of the parison in a closure forming cavity 62; and (iv) compression molding a portion of the parison in the closure forming cavity 62 to produce a partially blow molded, partially compression molded closure 30 for the container body 12. Preferably, all of the above stated method steps are accomplished substantially simultaneously in high speed automated equipment.

According to the preferred method, various undercuts can be formed in the container body, such as, the depressions 46 formed in the recess 44 in the container body 12 as illustrated in FIG. 5. Typically, a blow mold cannot have structure which prevents a blow molded body to be released from the mold cavity. For instance, the formation of the depressions 46 in the container body 12 requires mold structure that extends laterally into the cavity 60 to from the depressions 46 and that would block the removal of the container body 12 form the mold since the container body 12 is blown behind and around the structure. However, the present invention overcomes this problem by utilizing a pair of extendable/retractable pins 70 which extend as the parison is blown and retract slightly before the blown container body 12 is released from the mold 58. Thus, the pins 70 form the depressions 46 in the container body 12 and are retractable to enable ready release of the container body 12 from the mold 58. Preferably, the pins 70 are extended by cylinders (not shown) which are precisely controlled to extend and retract at predetermined times during the blow molding cycle.

The method also includes a novel manner of releasing, or ejecting, the container body 12, closure 30, and flash 64 from the mold 58. The lid 30 tends to stick to the mold 58 since the lid 30 is relatively large and includes blow molded and compression molded portions, 32 and 34. The present invention utilizes an ejector plate 72 to force the lid 30 out of the mold 58. As best illustrated in FIG. 2, the ejector plate 72 is located in mold half 58*a* adjacent the closure forming cavity 62 and is extended into the closure forming cavity 62 after the mold blocks 58*a* and 58*b* open to eject the closure 30 from the mold 58 thereby releasing the closure 30 with the container body 12 and adjacent flash material 64. Preferably, the ejector plate 72 includes a pair of cylinders 72a and 72b which are extended at precisely controlled predetermined times during the blow molding cycle.

A further step in the preferred method is to trim the scrap material 74 from the container body 12 and lid 30. To this end, the tail flash 64 is cut from the base 14 of the container 12 and trimmed away from the lid 30 formed in the tail flash 64. Preferably as illustrated in FIG. 3, the container body is blown with a false dome 76 which must also be severed from the container body 12. The blown false dome 76 includes a groove 78 used by trimming equipment to spin the container body 12 and false dome 76 relative to a knife in the trimmer. Thus, the knife severs the false dome 76 from the container body 12 and provides the container body 12 with a smooth inwardly extending lip 80 to which wax paper, or the like, can be bonded to initially seal the container body 12 after filling.

A final step includes assembling the lid 30 to the container body 12 after they have been completely separated during trimming. The projections 42 on the hinge connection flap 40 of the lid 30 are inserted into the depressions 46 formed in the container body 12 to connect the lid 30 to the container body 12. The lid 30 is pivoted relative to the container body 12 and snap fit onto the rim 28.

Detailed Description of the Preferred Apparatus

The primary component of the apparatus according to the present invention utilized to manufacture the container and closure combination of the present invention are the mold blocks 58a and 58b as previously discussed. The multi-part mold 58 must be capable of opening and closing relative to an extruded parison to capture the parison therein. In addition, the mold 58 must define a container body forming cavity 60 and a separate closure forming cavity 62 a spaced distance from the container body forming cavity 60.

As best illustrated in FIG. 3, the container body forming cavity 60 defines the shape of the container body 12 and includes a false blow dome cavity area 82. The formation of a false dome 76 enables ready spin trimming of scrap material from the top of the container body 12 so that a smooth inwardly extending lip 80 can be provided on the rim 28 of the trimmed container body 12. The walls of the container body forming cavity 60 also include extendable/retractable pins 70 which enable undercuts to be formed in the container body 12 in a manner permitting ready release of the container body 12 from the mold 58. The extension and retraction of the pins 70 are precisely controlled and linked to the blow molding cycle.

As best illustrated in FIG. 3, the closure forming portion 62 includes a blow molding area 66 and a compression molding area 68. The blow molding area 66 is centrally located and is surrounded by the compression molding area 68. Thus, a central portion 32 of the lid 30 is formed by blow molding, and a peripheral portion 34 of the lid 30 is formed by compression molding. Preferably, the compression molding area 68 is utilized to form a hinge connection flap 40 utilized to pivotally connect the lid 30 to the container body 12. The closure forming cavity 62 also includes an ejector plate 72 which extends into the cavity 62 to cause the forced release of the lid 30 from the mold 58. The ejector plate 72 is set to operate at a precise predetermined time in the blow molding cycle.

The apparatus also includes a pair of blow pins which are inserted into the parison to inflate the parison. A first blow pin (not shown) is utilized to inflate the container body 12 and extends into a part of the parison which forms the blown false dome 76. A second blow pin 84 is utilized to inflate the blow molded portion 32 of the closure 30. Preferably, the blow pin 84 is inserted through the cavity wall adjacent the location of the ejector plate 72. In addition, the aperture 86 formed in the lid 30 by the blow pin 84 is preferably formed on the underside 88 of the lid 30. Thus, as illustrated in FIG. 2, a blow cylinder 90 is located between the pair of ejector plate cylinders, 72a and 72b, which also extend toward the underside 88 of the lid 30.

The apparatus of the present invention also includes a timing mechanism (not shown) to precisely control the operation of the mold and blow pins. To this end, the blow pins are controlled to simultaneously blow the lid 30 and container body 12. In addition, the retractable pins 70 utilized to form the undercuts in the container body 12 are extended during inflation of the container body 12. As the mold 58 opens to release the container body 12 and lid 30, the pins 70 are retracted and the ejector plate 72 is extended into the lid forming cavity 62.

Thus, the described container and closure combination, method of making the combination, and apparatus for making the combination provide a unique and cost-effective package which can be entirely manufacture in a blow mold utilizing a single extruded parison. Preferably, the blow molded container has a tub-shape, and the lid has a novel reinforced structure which resists warpage. The lid can be provided such that it pivots relative to the container body, and the container body can be formed with various undercut areas. In addition, the container body and lid are readily released from the mold utilizing an ejector plate.

While a preferred container and closure combination, method of making the combination, and apparatus for making the combination have been described in detail, various modifications, alterations, and changes may be made without departing from the spirit and scope of the present invention as defined in the appended claims.

What is claimed is:

1. A container, comprising:

a container body having an upper rim; and a plastic lid having a solid outer peripheral compression molded portion and a hollow central blow molded portion;

said solid outer peripheral compression molded portion extending outwardly and integrally from said hollow central blow molded portion and being engageable with said upper rim to secure said lid to said container; and said hollow central blow molded portion including an upper wall forming an upward facing side of said hollow central blow molded portion and a lower wall forming an underside of said hollow central blow molded portion, said upper wall extending above and being spaced from said lower wall such that a hollow cavity is formed between said upper and lower walls.

2. A container according to claim 1, wherein said upper and lower walls merge together at said peripheral compression molded portion to define an outer peripheral extent of said hollow cavity.

3. A container according to claim 2, wherein said underside of said hollow central blow molded portion has an aperture formed by a blow pin.

4. A container according to claim 3, wherein said upper wall is spaced no greater than about 0.5 inch from said lower wall.

5. A combination container and lid, said container having an extrusion blow molded body wit an upper rim, and said lid comprising:

a hollow central blow molded portion; and a peripheral compression molded portion extending outwardly and integrally from said hollow central blow molded portion of said lid;

said peripheral compression molded portion of said lid being engageable with said upper rim to secure said lid to said container; and said hollow central blow molded portion including an upper wall forming an upward facing side of said hollow central blow molded portion and a lower wall spaced from said upper wall and forming an underside of said hollow central blow molded portion such that a hollow cavity is formed therebetween;

whereby said hollow central blow molded portion of said lid reinforcing said lid to increase rigidity and definition and prevent warpage.

6. A combination container and lid according to claim 5, wherein said peripheral compression molded portion of said lid includes a hinge connection flap which is attachable to said container body to permit said lid to pivot between open and closed positions relative to said upper rim of said container.

7. A combination container and lid according to claim 6, wherein said extrusion blow molded container body has a recess adjacent said upper rim for receiving said hinge connection flap.

8. A combination container and lid according to claim 5, wherein said container body is substantially rectangular and said lid snap engages to said container body about said upper rim to seal said container body.

9. A combination container and lid according to claim 5, wherein said upper and lower wails merge together at said peripheral compression molded portion to define an outer peripheral extent of said hollow cavity.

10. A combination container and lid according to claim 5, wherein said underside of said hollow central blow molded portion of said lid has an aperture formed by a blow pin utilized to blow said hollow central blow molded portion of said lid in a blow mold.

11. A combination container and lid according to claim 5, wherein said upper wall extends above and substantially parallel to said lower wall.

12. A combination container and lid according to claim 11, wherein said upper wall is spaced no greater than about 0.5 inch from said lower wall.

13. A combination container and closure prepared by a process comprising the steps of:

extruding a parison within an open set of mold blocks which, when closed, cooperate to form a container forming cavity and a separate closure forming cavity;

closing said mold blocks on said parison such that said parison extends trough said container forming cavity and said closure forming cavity of said mold blocks;

blow-molding said parison located in said container forming cavity to form a container body;

separately blow molding a portion of said parison located in said closure forming cavity to form at least a part of a closure, said blow molded portion of said closure including an upper wall forming an upward facing side of said blow molded portion of said closure and a lower wall forming an underside of said blow molded portion of said closure, said upper wall extending above and being spaced from said lower wall such that a hollow cavity is formed therebetween; and compression molding a portion of said parison located in said closure fanning cavity to form a remaining part of said closure integral with said blow molded part of said closure;

wherein said blow molding of said container body, said blow molding of said part of said closure, and said compression molding of said remaining part of said closure occur substantially simultaneously.

* * * * *

UNITED STATES PATENT AND TRADEMARK OFFICE
CERTIFICATE OF CORRECTION

PATENT NO. : 6,669,049 B2
DATED : December 30, 2003
INVENTOR(S) : Crider

It is certified that error appears in the above-identified patent and that said Letters Patent is hereby corrected as shown below:

Column 8,
Line 66, "molded body wit an" should read -- molded body with an --

Column 10,
Line 15, "extends trough said" should read -- extends through said --
Line 29, "closure fanning cavity" should read -- closure forming cavity --

Signed and Sealed this

Thirtieth Day of March, 2004

JON W. DUDAS
*Acting Director of the United States Patent and Trademark Office*